United States Patent
Howe et al.

(10) Patent No.: US 6,492,436 B2
(45) Date of Patent: Dec. 10, 2002

(54) TIRE SEALER AND INFLATING COMPOSITION AND METHOD OF USE

(75) Inventors: Michael W. Howe, The Woodlands, TX (US); John W. Amszi, Cleveland, TX (US); Roderic G. Mathews, The Woodlands, TX (US)

(73) Assignee: Pennzoil-Quaker State Company, Houston, TX (US)

( * ) Notice: Subject to any disclaimer, the term of this patent is extended or adjusted under 35 U.S.C. 154(b) by 0 days.

(21) Appl. No.: 09/884,265

(22) Filed: Jun. 19, 2001

(65) Prior Publication Data

US 2002/0049260 A1 Apr. 25, 2002

Related U.S. Application Data

(60) Provisional application No. 60/212,744, filed on Jun. 20, 2000.

(51) Int. Cl.$^7$ .......................... C08K 3/36; B29C 73/00; C08L 15/02
(52) U.S. Cl. ..................... 523/166; 152/503; 152/504; 152/509; 222/4; 521/78; 521/98
(58) Field of Search ..................... 521/78, 98; 152/503, 152/504, 509; 523/166; 222/4

(56) References Cited

U.S. PATENT DOCUMENTS

| | | |
|---|---|---|
| 3,483,053 A | 12/1969 | Miserentino et al. |
| 3,972,446 A | 8/1976 | Williams et al. |
| 4,501,825 A | 2/1985 | Magyar et al. |
| 5,124,395 A | 6/1992 | Abramowski et al. |
| 5,338,776 A | 8/1994 | Peelor et al. |
| 5,439,947 A | 8/1995 | Bartlett et al. |
| 5,618,912 A | 4/1997 | Fang |
| 5,648,406 A | 7/1997 | Peelor et al. |
| 5,705,604 A | 1/1998 | Fang |
| 5,765,601 A | 6/1998 | Wells et al. |
| 5,977,196 A | 11/1999 | Wicks |

*Primary Examiner*—Morton Foelak
(74) *Attorney, Agent, or Firm*—Jenkens & Gilchrist

(57) ABSTRACT

A tire sealer and inflating composition and products made therefrom are described. The tire sealer and inflating composition includes a sealant, a non-flammable propellant with an ozone depletion potential of zero or substantially close to zero, and one or more aromatic hydrocarbons capable of lowering the vapor pressure of the non-flammable propellant. Moreover, the tire sealer and inflating composition has a vapor pressure less than about 180 psig at 130° F. A preferred propellant is 1,1,1,2-tetrafluoroethane, although other fluorocarbons can also be used. A preferred aromatic hydrocarbon is AROMATIC 150, which is a mixture of aromatic compounds. The tire sealer and inflating composition can either be aqueous or non-aqueous. The disclosed tire sealer and inflating composition is capable of inflating a flat tire or other inflatable objects and seal a puncture wound.

47 Claims, No Drawings

TIRE SEALER AND INFLATING COMPOSITION AND METHOD OF USE

CROSS REFERENCE TO RELATED APPLICATIONS

This application claims priority to a prior Provisional patent application Ser. No. 60/212/744, filed Jun. 20, 2000, entitled Tire Sealer and Inflating Composition and Method of Use.

FEDERALLY SPONSORED RESEARCH

Not applicable.

REFERENCE TO MICROFICHE APPENDIX

Not applicable.

FIELD OF THE INVENTION

This invention relates to a composition and method for inflating and sealing inflatable objects. More particularly, the invention relates to a tire sealing and inflating composition and methods of using the composition.

BACKGROUND OF THE INVENTION

Portable tire sealing and inflating devices have been used in emergency by a motorist to inflate and temporarily seal a pneumatic tire with a puncture wound when a service station or other repair facilities is not available to the motorist. The use of such devices, typically for an automobile, allows the motorist to drive the vehicle to a convenient location where the punctured or flat tire can be inspected and repaired. The availability of such devices obviates the need for the motorist to remove the flat tire from an automobile and replace it with a spare tire in order to reach a service station to repair the damaged tire. More importantly, such portable devices are extremely desirable if the motorist is stranded in a dangerous situation or if the motorist either does not have a spare tire or is physically unable to replace the flat tire with a spare tire.

Generally, a portable tire sealing and inflating device includes a conventional aerosol can containing a particular sealant composition which is introduced to the cavity of a flat tire through a valve stem. Typically, a length of flexible tubing connects a valve on the can with a threaded nozzle and connector on the remote end for attachment to and activation of the valve stem. Alternatively, the can is supplied with a pedestal valve for activation and dispensing of the contents without flexible tubing. A propellant within the can forces the sealant composition through the opened valve and into the tire. In this way, the tire is inflated and sealed.

At present time, most available portable tire sealing and inflating devices are based on aerosol, which is formed by a sealant composition and a propellant. Various hydrocarbons and chlorofluorocarbons have been used as propellants. However, hydrocarbon propellants are flammable, and the chlorofluorocarbon (CFC) propellants have been found to have a detrimental effect on the earth's ozone layer and use thereof has been severely limited.

As a result, there has been a continuing effort to develop suitable CFC substitutes. However, several problems should be resolved when replacing chlorofluorocarbon or hydrocarbon propellants/inflators used in existing tire sealant and inflator compositions with a nonflammable, non-ozone depleting propellant/inflator. These problems are due to the differences between the vapor pressures of existing propellant/inflators and suitable CFC substitutes, relatively poor solvent properties of CFC substitutes, relatively high diffusion rates of CFC substitutes, and difficulties in obtaining consistent discharge rates throughout the life of tire sealer and inflator products when using a CFC substitute.

Additional consideration is the safety issue. Tire sealant/inflator cans are frequently stored in the trunks of vehicles, or worse, are exposed to direct sunlight. Therefore, internal pressure and can strength are very important safety parameters, which must be considered in producing a tire sealant/inflator composition. The higher the vapor pressure of a propellant, the higher the chance a container may burst in hot weather. Needless to say, it is important that any non-flammable, non-ozone depleting propellant/inflator used in a tire sealer and inflator composition be capable of storage in canisters which can be safely transported. The U.S. Department of Transportation ("DOT") has issued regulations regarding the minimum performance characteristics of containers which can be used in interstate transportation. For example, for an aerosol can of the 2Q type, the vapor pressure inside the can must not exceed 180 psig at 130° F. As such, any tire sealer and inflator products must comply with this requirement if a 2Q aerosol can is used.

1,1,1,2,-tetrafluoroethane, commonly known as HFC 134a, was developed as a replacement for chlorofluorocarbons. It is non-flammable, non-corrosive, and non-toxic. More importantly, it has an ozone depletion potential of zero. Consequently, there has been some interest in replacing CFC propellants by HFC 134a. However, attempts to substitute HFC 134a for conventional CFC propellants/inflators have not been met without difficulties. This is because HFC 134a has a vapor pressure of about 200 psig at 130° F., which is too high to meet the DOT requirements for use in aerosol cans. Moreover, HFC 134a is not miscible with aqueous solvents, and therefore, tire sealant/inflator compositions made by replacement of existing hydrocarbon or CFC propellants with HFC 134a would require vigorous and frequent agitation before and during use to prevent disproportionate dispensing of the sealant.

For the foregoing reasons, there exists a need for a safe tire sealer and inflating composition and products made therefrom. Preferably, the tire sealing and inflating composition should be non-flammable, non-toxic, and environmentally-friendly.

SUMMARY OF THE INVENTION

The above need is met by embodiments of the invention in one or more of the following aspects. In one aspect, the invention relates to a tire sealer and inflating composition. The composition includes: (a) a sealant capable of sealing an opening in an inflatable object; (b) a non-flammable propellant having an ozone depletion potential of zero or substantially close to zero; and (3) one or more aromatic hydrocarbons capable of lowering the vapor pressure of the non-flammable propellant. Preferably, the composition has a vapor pressure less than about 180 psig at 130° F. In some embodiments, the propellant is 1,1,1,2-tetrafluoroethane.

In another aspect, the invention relates to a method of sealing a puncture wound in an inflatable object. The method includes: (a) storing a tire sealer and inflating composition in a can having a vapor pressure less than about 180 psig at 130° F., and (b) delivering the tire sealer and inflating composition to an inflatable object having a puncture wound. The tire sealer and inflating composition includes: (a) a sealant capable of sealing an opening in an inflatable object; (b) a non-flammable propellant having an ozone depletion potential of zero or substantially close to zero; and (c) one or more aromatic hydrocarbons capable of lowering the vapor pressure of the non-flammable propellant.

In still another aspect, the invention relates to a method of making a tire sealer and inflating composition. The method includes: (a) obtaining a sealant capable of sealing an opening in an inflatable object; (b) obtaining a non-flammable propellant having an ozone depletion potential of zero or substantially close to zero; and (c) mixing one or more aromatic hydrocarbons capable of lowering the vapor pressure of the non-flammable propellant with the sealant and the non-flammable propellant; wherein the composition has a vapor pressure less than about 180 psig at 130° F.

Additional aspects of the invention and advantages provided by the embodiments of the invention are apparent with the following description.

BRIEF DESCRIPTION OF THE DRAWINGS

Not applicable.

DESCRIPTION OF EMBODIMENTS OF THE INVENTION

Embodiments of the invention provide a new tire sealer and inflating composition which can be used to seal a puncture wound in a tire and inflate the flat tire. The tire sealer and inflating composition includes a sealant capable of sealing an opening in an inflatable object, a non-flammable propellant with an ozone depletion potential of zero or substantially close to zero, and one or more aromatic hydrocarbons capable of lowering the vapor pressure of the non-flammable propellant. The resulting composition should preferably have a vapor pressure of less than about 180 psig at 130° F. Depending on the type and the amount of the aromatic vapor pressure depressant used, the vapor pressure of the resulting composition may vary. In some embodiments, the vapor pressure of a tire sealer and inflating composition is less than about 170 psig at 130° F., whereas in other embodiments the vapor pressure of the tire sealer and inflating composition is less than 160 psig at 130° F. In still other embodiments, the vapor pressure of the tire sealer and inflating composition may fall below 150 psig at 130° F.

A suitable propellant should have an ozone depletion potential of zero or substantially close to zero due to the environmental regulation imposed by the Environmental Protection Agency. Preferably, a suitable propellant is a fluorocarbon which is represented by the formula $C_mH_nF_l$, where m, n, l are positive integers respectively. Moreover, m, n, and l satisfy the following equation $2m+2=n+l$. Preferably, m is equal to 2, i.e., fluorine-substituted ethane.

Examples of preferred propellants include, but are not limited to, 1,1-difluoroethane, 1,1,1,-trifluoroethane, difluoromethane, 1,1,-difluoro-2,2,2-trifluoroethane, 1,1,2,2-tetrafluoroethane, 1,1,1,2-tetrafluoroethane, etc. It is noted that 1,1,1,2-tetrafluoroethane is a more preferred propellant because it is approved by the Environmental Protection Agency for use in aerosol formulations. However, this should not be construed to mean that 1,1,1,2-tetrafluoroethane is the only suitable propellant. Other fluorocarbon propellants, although not approved by the Environmental Protection Agency, can also be used in embodiments of the invention. In fact, in circumstances where flammability is not a major concern, hydrocarbon propellants may also be used in addition to or in place of fluorocarbon propellants in embodiments of the invention.

When the vapor pressure of a selected propellant is greater than 180 psig at 130° F., it is sometimes necessary to use a vapor pressure depressant to lower the vapor pressure to less than 180 psig at 130° F. Any compound that is capable of lowering the vapor pressure of a selected propellant to less than about 180 psig at 130° F. can be used in embodiments of the invention. Preferably, one or more aromatic hydrocarbons are used as a vapor pressure depressant for a selected propellant, such as 1,1,1,2-tetrafluoroethane. These compositions are referred hereinafter as "aromatic vapor pressure depressant."

Suitable aromatic vapor pressure depressants include, but are not limited to, aromatic hydrocarbons such as substituted and unsubstituted benzene, and polynuclear aromatic compounds, such as naphthalene, anthracene and phenanthracene, and mixtures thereof. It is noted that substitution on the aromatic ring can be single or multiple. Suitable substituents include, but are not limited to, methyl, ethyl, propyl, butyl, hydroxyl, phenyl, carboxylate, halogen, perfluoroalkyl, and so on. In some embodiments, the aromatic compounds may be represented by the following formula:

wherein n can be vary from 0 to 6 to denote unsubstituted and substituted aromatic compounds, and R can be any organic radical. Preferably, R is an alkyl group with 1 to 20 carbon atoms, although an alkyl with 20 carbon atoms or more may also be used. More preferably, the alkyl group should have 1 to 10 carbon atoms. The alkyl group can be a straight chain, branched chain, or a phenyl group with or without substitution.

Examples of aromatic compounds which may be used in embodiments of the invention include, but are not limited to, benzene, toluene, o,m,p-xylene, pseudocumene, ethylbenzene, n-propylbenzene, cumene, n-butylbenzene, isobutylbenzene, sec-butylbenzene, tert-butylbenzene, dimethyl benzene, trimethyl benzene, tetramethyl benzene, biphenyl, diphenylmethane, triphenyl methane, 1,2-diphenylethane and similarly alkyl-substituted naphthalenes and anthracenes. Additional aromatic compounds also include phenol, catechol, acylphenol (such as acetylphenol), carbonate esters (such as phenyl methyl or ethyl carbonate and diphenyl carbonate), alkylphenol (such as anisole), chloro and bromo-benzene, aniline, acyl aniline (such as acetanilide), methyl and ethylbenzoate, thiophenol and acylated thiophenol, nitrobenzene, diphenylether, diphenylsulfide and similarly substituted naphthalenes and anthracenes, in particular naphthols (such as mono and dihydroxy naphthalene). The above aromatic compounds may be used alone or in a mixture with other aromatic compounds.

An example of a suitable aromatic hydrocarbon is a product known as AROMATIC 150 Fluid from Exxon Chemical. AROMATIC 150 Fluid is composed of mainly aromatic compounds, i.e., at least about 98.0% by volume. It has a flash point of at least about 63° C. The boiling point range is between about 179° C. and about 213° C. AROMATIC 150 typically is composed of a narrow-cut aromatic solvent containing about 23 wt. % tetra-methyl benzenes, about 22 wt. % ethyl dimethyl benzenes, about 15 wt. % mono-, di- and tri-methyl indanes, about 8 wt. % diethyl benzenes, about 8 wt. % naphthalene, about 5 wt. % trimethyl benzenes, about 2 wt. % indane, and about 1 wt. % or less of methyl ethyl benzenes, propyl benzenes, methyl propyl benzenes, butyl benzenes, hexyl benzenes, indene, methyl naphthalenes, and xylenes.

Another example of an aromatic hydrocarbon is a product known as AROMATIC 100 Fluid from Exxon Chemical. AROMATIC 100 Fluid is composed of mainly aromatic compounds, i.e., at least about 98.0% by volume. The boiling point range is between about 154° C. and about 174° C. AROMATIC 100 solvent typically is composed of a narrow-cut aromatic solvent containing about 40 wt. % trimethyl benzenes, about 35 wt. % methyl ethyl benzenes, about 10 wt. % propyl and isopropyl benzenes, about 3 wt. % ethyl dimethyl benzenes, about 2 wt. % methyl (n- and iso-) propyl benzenes, about 2 wt. % diethyl benzenes, about less than 1 wt. % each of mono butyl benzenes and tetramethyl benzenes, about 6 wt. % xylenes and minor amounts of ethyl benzene and $C_{10}$–$C_{11}$ saturates.

Yet another example of an aromatic hydrocarbon composition is a product known as AROMATIC 200 from Exxon Chemical. AROMATIC 200 is composed predominantly of $C_9$–$C_{13}$ aromatic hydrocarbons, primarily $C_{10}$–$C_{12}$. It has a boiling range from about 230° C. 275° C. (450° F.–527° F.). The average molecular weight of AROMATIC 200 is about 161. AROMATIC 200 includes approximately 14 wt. % naphthalene. Because AROMATIC 200 has a minimum flash point of 203° F., it can be added to a tire sealer and inflating composition to increase the flash point of the entire composition.

Additional suitable vapor pressure depressants include, but are not limited to, halogen-substituted aromatic compounds. For example, the following aromatic hydrocarbons can be used as a vapor pressure depressant in embodiments of the invention: monochlorotoluene (e.g., 1-chloro-2-methyl benzene, 1-chloro-4-methyl benzene, or mixtures thereof); para-chloro-trifluoromethyl benzene; and 1,2-dichloro-4-trifluoromethyl benzene. Other substituted benzotrifluorides can also be used. These aromatic hydrocarbons can be obtained from Occidental Chemical Corporation in Dallas, Tex., under the trade name of Oxsol® 10, Oxsol® 100, Oxsol® 1000, and Oxsol® 2000.

In addition to aromatic vapor pressure depressants, non-aromatic vapor pressure depressants may be used in addition to or in place of an aromatic vapor pressure depressant. Examples of non-aromatic vapor pressure depressants include, but are not limited to, acetone, methyl ethyl ketone, acetonitrile, tributyl phosphate, 2-butoxyethanol, butyl acetate, diethylene glycol monobutyl ether, cellosolve acetate, dimethoxymethane, 2-hydroxy-4-methyl-2-pentanone. It is noted that other ketones, diethers, hydroxyketones, acetates, can also be used as a vapor pressure depressant.

Any sealant or sealing composition which is capable of sealing a puncture or opening in an inflatable object, such as a tire, can be used in embodiments of the invention. One example of a suitable resin is petroleum residual resins, which include petroleum resins, vacuum residuums and asphalt. Petroleum resins are petroleum distillation residues comprised mainly of polycyclic hydrocarbons. Vacuum residuums are one of the major products of vacuum distillation. Asphalt is a hydrocarbon residue resulting from the distillation of crudes of high asphaltic content. In additional to a petroleum residual resin, a polymeric resin can be used in addition to or in place of a petroleum residual resin. Any polymeric resin known in the art can be used. One example of a polymeric resin is polyolefins. For example, a propylene-ethylene co-polymer resin sold under the trade name of EASTOFLEX Amorphous Polyolefin E 1003 available from Eastman Chemical Company, Kingsport, Tenn., can be used as a sealant in embodiments of the invention. Another suitable polymeric resin is an aromatic resin (i.e., a petroleum hydrocarbon resin with aromatic rings) sold under the name of PM-1 available from American Modifiers, Inc. Other suitable sealants include, but are not limited to, a polyvinyl acetate emulsion sold under the trade name FLEXBOND 150 Emulsion® available from Air Products & Chemicals, Inc., phenolic resins (such as phenol-formaldehyde resins and halogenated alkylphenol resins), gylcerol esters of hydrogenated wood rosins, latex sealant compositions, acrylic resins, and so on.

In addition to a propellant, a vapor pressure depressant, and a sealant, the tire sealer and inflating compositions may further include one or more of the following components: a carrier, a corrosion inhibitor, a freezing point depressant, an emulsifier, fibers, and other ingredients such as dispersion agents, rust inhibitors, foaming agents, antioxidants, etc. It is also noted that the tire sealer and inflating composition can be either aqueous or non-aqueous. When an aqueous tire sealer and inflating composition is desired, water is added as a carrier. On the other hand, when a non-aqueous tire sealer and inflating composition is desired, a solvent other than water is added as a carrier. Any known solvent can be used. For example, U.S. Pat. No. 3,483,053 discloses a number of solvents that can be used in embodiments of the invention to formulate a non-aqueous tire sealer and inflating composition. The disclosure of this patent is incorporated by reference herein in its entirety.

Suitable corrosion inhibitors include, but are not limited to, ammonia, triethanolamine and capryloamphoprionate, although any other known corrosion inhibitors can be used. These corrosion inhibitors are used either alone or in combination of varying proportions. A corrosion inhibitor is generally present the tire sealer and inflating composition in an amount from about 0.1 to 20 wt. %. In preferred embodiments, the corrosion inhibitor is present in an amount from about 0.15 to 10 wt. %, and most preferably from about 0.2 to 7 wt. %.

When water is used as a carrier, it is sometimes necessary to use a surfactant or emulsifier An emulsifier can be either ionic or nonionic. A nonionic blend is usually made up of two or more compounds one of which favors the oil phase and the other favors the water phase. They can be ethoxylates, alcohols, phenols, sugars, esters, amines, amides, alkanolamides, etc. A preferred emulsifier is tall oil fatty acid, morpholine, or a mixture thereof. Additional emulsifiers include, but are not limited to, ethoxylated alkylphenol, ammonium or metal salts of sulfated or sulfonated ethoxylated alkylphenols, polyethoxylated alcohols, and polyethoxylated esters. These surfactants or emulsifiers can be used either alone or in combination in varying proportions. Generally, an emulsifier is present in the tire sealer and inflating composition in an amount from about 0.1 to 30 wt. %. In preferred embodiments, the emulsifier is present in an amount from about 0.2 to 25 wt. % and most preferably from about 0.5 to 20 wt. %.

In some embodiments, a freezing point depressant is added to lower the freezing point of the tire sealer and inflating composition. A preferred freezing point depressant is ethylene glycol, although other freezing point depressants may also be used. Freezing point depressants can be used alone or in combination of varying proportions. Generally, a freezing point depressant is present in a tire sealer and inflating composition in an amount from about 0.1 to 15 wt. %. In preferred embodiments, the freezing point depressant is present in an amount from about 0.5 to 12 wt. %, and most preferably from about 1.5 to 10 wt. %.

In some other embodiments, fibers are added to a tire sealer and inflating composition to promote clotting when the composition is applied to a puncture in an inflatable object, such as a tire. Suitable fibers include, but are not limited to, inorganic fibers, such as asbestos and fiberglass, and organic fibers, such as cellulose, polypropylene, and similar natural or synthetic polymeric fibers. In addition, wood fibers can also be used. Preferably, wood fibers, cellulosic fibers, or mixtures thereof are used in embodiments of the invention. The optional fibers are generally present in the tire sealer and inflating composition in an amount from about 0.1 to 20 wt. %. In preferred embodiments, the fiber is present in an amount from about 0.2 to 15 wt. %, and most preferably from about 0.3 to 10 wt. %.

As described above, a number of ingredients or components may be present in a tire sealer and inflating composition in accordance with embodiments of the invention. The following table shows the preferred ranges for each component. It should be recognized that these ranges are merely preferences, and that not all listed components need to be present in a tire sealer and inflating composition. A composition falling outside the preferred ranges are still within the scope of the invention described and claimed herein. The weight percentages are based on the total weight of a tire sealer and inflating composition.

TABLE 1

| Component | Preferred Range | More Preferred Range | Most Preferred Range |
| --- | --- | --- | --- |
| Resin | 1–65 wt.% | 1.5–52 wt.% | 2.0–52 wt.% |
| Propellant | 10–99 wt.% | 15–89 wt.% | 18–85 wt.% |
| Vapor Pressure Depressant | 0.1–90 wt.% | 0.15–75 wt.% | 0.2–65 wt.% |
| Carrier | 1–95 wt.% | 10–85 wt.% | 15–80 wt.% |
| Emulsifier | 0.1–30 wt.% | 0.2–25 wt.% | 0.5–20 wt.% |
| Corrosion Inhibitor | 0.1–20 wt.% | 0.15–10 wt.% | 0.2–7 wt.% |
| Freezing Point Depressant | 0.1–15 wt.% | 0.5–12 wt.% | 1.5–10 wt.% |
| Fibers | 0.1–20 wt.% | 0.15–15 wt.% | 0.2–10 wt.% |

Although suitable components that can be used in embodiments of the invention are described in some detail, additional suitable resins, vapor pressure depressants, propellants, emulsifiers, corrosion inhibitors, freezing point depressants, and fibers are disclosed in the following U.S. Pat. Nos.: 3,483,053; 4,501,825; 4,970,242; 5,124,395; 5,284,895; 5,439,947; 5,500,456; 5,618,912; 5,648,406; 5,705,604; 5,765,601; 5,834,534; 5,916,931; and 5,977,196. The disclosures of all of the preceding patents are incorporated herein by reference in their entirety.

The tire sealer and inflating composition can be manufactured by mixing a suitable sealant, a suitable propellant, and a suitable vapor pressure depressant to form the desired composition. If a 2Q aerosol can is to be used as a container, the vapor pressure of the tire sealer and inflating composition should be less than 180 psig at 130° F. Any mixing method can be used, and the required components can be mixed in any sequence or manner. Optionally, a carrier, an emulsifier, a corrosion inhibitor, a freezing point depressant, and other additives can be mixed individually or in combination with a tire sealer and inflating composition. After the composition is obtained, a portable tire sealer and inflating product can be made by placing the composition inside a conventional aerosol can.

Generally, a conventional aerosol can includes an actuator for releasing the tire sealer and inflating composition inside the can. During use, the actuator on the can is connected to the valve system of a flat tire by a flexible tubing with an appropriate length. After opening the actuator, the propellant inside the can forces the sealant composition through the actuator and the valve system into the tire. In this way, a flat tire is inflated and the puncture wound is sealed. It is noted that any container can be used to store the tire sealer and inflating composition. For example, U.S. Pat. No. 5,765,601 discloses various containers for storing a tire sealer and inflating composition. The disclosed containers may also be used in embodiments of the invention to manufacture portable tire sealer and inflating devices. Hence, the disclosure of U.S. Pat. No. 5,765,601 is incorporated herein by reference in its entirety.

The following examples are presented to illustrate various embodiments of the invention. All numerical values are approximate numbers. The specific details in each example should not be construed to limit the invention as otherwise described and claimed herein. The following tables show various tire sealer and inflating compositions made in accordance to embodiments of the invention. The amount of each component is expressed in grams. In each of the examples below, about 25 wt. % of the tire sealer and inflating compositions was 1,1,1,2 tetrafluoroethane, although a higher or lower amount may be used. Each composition was placed in a 2Q aerosol can, and the vapor pressure of the composition at 130° F. was measured. Some of the tire sealer and inflating compositions were used to inflate a flat tire. It was found that they were able to inflate a flat tire to a pressure up to about 13 psig and seal the puncture wound. The repaired tire had good driveability.

| | I | II | III | IV | V | VI | VII | VIII | IX | X |
| --- | --- | --- | --- | --- | --- | --- | --- | --- | --- | --- |
| Amorphous Polyolefin | 3.590 | 3.590 | 3.590 | 3.590 | 3.590 | 3.590 | 3.590 | 3.590 | 3.590 | 14.36 |
| Aromatic Resin | 2.565 | 2.565 | 2.565 | 2.565 | 2.565 | 2.565 | 2.565 | 2.565 | 2.565 | 5.13 |
| Cellulose Fiber | 0.400 | 0.400 | 0.400 | 0.400 | 0.400 | 0.400 | 0.400 | 0.400 | 0.400 | 0.800 |
| Wood Fiber | 0.200 | 0.200 | 0.200 | 0.200 | 0.200 | 0.200 | 0.200 | 0.200 | 0.200 | 0.200 |
| AROMATIC 150 | 42.196 | 26.100 | 19.505 | 19.505 | 21.098 | 17.589 | 18.672 | — | 86.69 | 79.51 |
| AROMATIC 200 | — | 8.699 | 19.505 | 19.505 | 21.098 | 5.860 | 18.672 | 42.196 | — | — |

-continued

|  | I | II | III | IV | V | VI | VII | VIII | IX | X |
|---|---|---|---|---|---|---|---|---|---|---|
| Emulsifier |  |  |  |  |  |  |  |  |  |  |
| Nonionic Blend | 1.5 | 5.00 | 1.500 | 5.00 | 1.500 | — | — | — | — | — |
| Tall Oil Fatty Acid | — | — | — | 1.00* | — | 3.000 | 3.000 | 3.000 | — | — |
| Morpholine | — | — | — | — | — | 0.920 | 0.920 | 0.920 | — | — |
| Water | q.s.** | q.s. | q.s. | q.s. | q.s. | q.s. | q.s. | q.s. | — | — |
| Can Pressure @ 130° F. | 173 | 178 | 173 | 178 | 176 | 178 | 176 | 183 | 173 | 173 |

*triethanolamine stearate added
**"q.s." stands for quantity sufficient to add up to 100 wt %.

EXAMPLE 2

|  | I | II | IIa | III | IV | V | VI |
|---|---|---|---|---|---|---|---|
| Amorphous Polyolefin | 7.18 | 7.18 | 7.18 | 7.18 | 7.18 | 7.18 | 7.18 |
| Aromatic Resin | 5.13 | 5.13 | 5.13 | 5.13 | 5.13 | 5.13 | 5.13 |
| Cellulose Fiber | — | — | — | — | — | — | — |
| Wood Fiber | — | — | — | — | — | — | — |
| AROMATIC 150 | — | — | — | — | — | — | — |
| Petroleum Resin | 51.79 | 51.79 | 51.79 | 51.79 | 51.79 | 51.79 | 51.79 |
| Para-chloro-benzotrifluoride | — | — | — | 15.38 | 15.38 | — | — |
| Monochlorotoluene | — | 15.38 | 30.38 | — | — | — | — |
| 1,2-dichloro-4 (trifluoromethyl) benzene | — | — | — | — | — | 15.38 | 30.38 |
| Heptane | 15.39 | — | — | — | — | — | — |
| 2-ethylhexanol | 20.51 | 20.51 | 5.51 | 20.51 | 5.51 | 20.51 | 5.51 |
| Can Pressure @ 130° F. | 179 | 183 | <180 | 173 | 163 | 181 | 177 |

EXAMPLE 3

|  | I | II | III | IV | V | VI |
|---|---|---|---|---|---|---|
| Amorphous Polyolefin | 7.18 | 7.18 | 7.18 | 7.18 | 7.18 | 7.18 |
| Aromatic Resins | 5.13 | 5.13 | 5.13 | 5.13 | 5.13 | 5.13 |
| Petroleum Resin | 51.79 | 51.79 | 51.79 | 51.79 | 51.79 | 51.79 |
| AROMATIC 150 | 35.9 | 35.9 | 33.40 | 34.9 | 35.4 | 35.65 |
| Acetone | — | 3.00 | 2.5 | 1.0 | 0.5 | 0.25 |
| Can Pressure @ 130° F. | 183 | 161 | 164 | 175 | 177 | 180 |

As demonstrated above, the tire sealer and inflating compositions in accordance with embodiments of the invention can be used to inflate and seal a punctured tire and other inflatable objects. The compositions can be used in most weather conditions, from below freezing to extremely hot. Because the vapor pressure of the tire sealer and inflating compositions can be lowered to below 180 psig at 130° F., a typical 2Q aerosol can be used to store such a composition. Therefore, it obviates the need for specialized cans or exempt cans (which are more expensive than a convention 2Q aerosol can). In some embodiments, the tire sealer and inflating compositions have a flash point exceeding 210° F., thereby providing improved fire safety. Moreover, some embodiments of the tire sealer and inflating compositions have zero flame extension. Due to the relative simplicity of the formula of the tire sealer and inflating composition, it is more cost-effective than some of the existing products. Moreover, some of the tire sealer and inflating compositions are non-toxic, non-flammable, and environmentally friendly. Additional benefits may include improved stability and better sealing performance, both short term and long term.

Other advantages provided by embodiments of the invention are apparent to those skilled in the art.

While the invention has been described with respect to a number of limited embodiments, variations and modifications exist. For example, although non-flammable, non-toxic, and environmentally friendly propellants are preferred, other propellants which do no meet all three requirements may still be used in some embodiments of the invention. Although the invention is described with reference to a flat tire, the application of the invention is not limited only to a flat tire. Rather, the invention is applicable to any inflatable object. Such objects include, but are not limited to, balloons, inflatable toys, life savers, beach balls, etc. While it is preferred that all ingredients of a tire sealer and inflating composition be premixed, it is also possible to separately store each or some of the components in separate containers and mix them inside an inflatable object. It should be noted that a vapor pressure depressant is needed only when the vapor pressure of a propellant exceeds 180 psig at 130° F. Thus, if a non-toxic, non-flammable, environmentally friendly propellant has a vapor pressure less than 180 psig at 130° F., it would not be necessary to use a vapor pressure depressant when formulating a tire sealer and inflating composition. Finally, if a specialized can or exempt can is used, it would also be unnecessary to use a vapor pressure depressant. The appended claims intend to cover all such variations and modifications as falling in within the scope of the invention as described herein.

What is claimed is:

1. A tire sealer and inflating composition, comprising:
   a sealant capable of sealing an opening in an inflatable object;
   a non-flammable propellant having an ozone depletion potential of zero or substantially close to zero; and
   one or more aromatic hydrocarbons capable of lowering the vapor pressure of the non-flammable propellant,
   wherein the composition has a vapor pressure less than about 180 psig at 130° F.

2. The tire sealer and inflating composition of claim 1, wherein the propellant is 1,1,1,2-tetrafluoroethane.

3. The tire sealer and inflating composition of claim 1, wherein the propellant is 1,1,2,2-tetrafluoroethane, 1,1-difluoroethane, 1,1,1-trifluoroethane, difluoromethane, or 1,1,-difluoro-2,2,2-trifluoroethane.

4. The tire sealer and inflating composition of claim 1, further comprising a carrier.

5. The tire sealer and inflating composition of claim 4, wherein the carrier is water.

6. The tire sealer and inflating composition of claim 1, further comprising an emulsifier.

7. The tire sealer and inflating composition of claim 6, wherein the emulsifier is tall oil fatty acid, morpholine, or a mixture thereof.

8. The tire sealer and inflating composition of claim 1, further comprising a corrosion inhibitor.

9. The tire sealer and inflating composition of claim 1, further comprising a freezing point depressant.

10. The tire sealer and inflating composition of claim 1, wherein the sealer includes a polymeric resin.

11. The tire sealer and inflating composition of claim 10, wherein polymeric resin is a propylene-ethylene copolymer, a petroleum hydrocarbon resin, or a mixture thereof.

12. The tire sealer and inflating composition of claim 10, wherein the sealer further includes fibers.

13. The tire sealer and inflating composition of claim 12, wherein the fibers are cellulose fibers, hardwood fibers, or mixtures thereof.

14. The tire sealer and inflating composition of claim 1, wherein the aromatic hydrocarbons include one or more alkylated benzene compounds.

15. The tire sealer and inflating composition of claim 14, wherein the aromatic hydrocarbons further include naphthalene.

16. The tire sealer and inflating composition of claim 1, wherein the aromatic hydrocarbons include trimethylbenzene.

17. The tire sealer and inflating composition of claim 1, wherein the aromatic hydrocarbons include trimethylbenzene and naphthalene.

18. The tire sealer and inflating composition of claim 1, wherein the aromatic hydrocarbons have a boiling range between about 179° C. and about 213° C.

19. The tire sealer and inflating composition of claim 1, wherein the aromatic hydrocarbons include about 23 wt. % tetra-methyl benzenes, about 22 wt. % ethyl dimethyl benzenes, about 15 wt. % mono-, di- and tri-methyl indanes, about 8 wt. % diethyl benzenes, about 8 wt. % naphthalene, about 5 wt. % trimethyl benzenes, about 2 wt. % indane, and about 1 wt. % or less of methyl ethyl benzenes, propyl benzenes, methyl propyl benzenes, butyl benzenes, hexyl benzenes, indene, methyl naphthalenes, and xylenes.

20. The tire sealer and inflating composition of claim 1, wherein the aromatic hydrocarbons are AROMATIC 150, AROMATIC 200, AROMATIC 100, or a mixture thereof.

21. The tire sealer and inflating composition of claim 1, wherein the aromatic hydrocarbons are 1-chloro-2-methyl benzene, 1-chloro-4-methyl benzene, p-chloro-trifluoromethyl benzene, 1,2-dichloro-4-trifluoromethyl benzene, or a mixture thereof.

22. The tire sealer and inflating composition of claim 1, wherein the tire sealer and inflating composition is stored in a can.

23. A tire sealer and inflating composition, comprising:
a sealant capable of sealing an opening in an inflatable object;
1,1,1,2-tetrafluoroethane;
a mixture of alkylated benzenes;
water; and
an emulsifier,
wherein the composition has a vapor pressure less than about 180 psig at 130° F.

24. The tire sealer and inflating composition of claim 23, wherein the mixture further includes naphthalenes.

25. A method of sealing a puncture wound in an inflatable object, comprising:
storing a tire sealer and inflating composition in a can, the composition having a vapor pressure less than about 180 psig at 130° F., the tire sealer and inflating composition comprising
a sealant capable of sealing an opening in an inflatable object;
a non-flammable propellant having an ozone depletion potential of zero or substantially close to zero; and
one or more aromatic hydrocarbons capable of lowering the vapor pressure of the non-flammable propellant, and
delivering the tire sealer and inflating composition to an inflatable object having a puncture wound.

26. The method of claim 25, wherein the inflatable object is a tire.

27. The method of claim 25, wherein the propellant is 1,1,1,2-tetrafluoroethane.

28. The method of claim 25, wherein the propellant is 1,1,2,2-tetrafluoroethane, 1,1-difluoroethane, 1,1,1-trifluoroethane, difluoromethane, or 1,1,-difluoro-2,2,2-trifluoroethane.

29. The method of claim 25, wherein the tire sealer and inflating composition further comprises a carrier.

30. The method of claim 29, wherein the carrier is water.

31. The method of claim 25, wherein the tire sealer and inflating composition further comprises an emulsifier.

32. The method of claim 31, wherein the emulsifier is tall oil fatty acid, morpholine, or a mixture thereof.

33. The method of claim 25, wherein the tire sealer and inflating composition further comprises a corrosion inhibitor.

34. The method of claim 25, wherein the tire sealer and inflating composition further comprises a freezing point depressant.

35. The method of claim 25, wherein the sealer includes a polymeric resin.

36. The method of claim 35, wherein the polymeric resin is a propylene-ethylene copolymer, a petroleum hydrocarbon resin, or a mixture thereof.

37. The method of claim 35, wherein the sealer further includes fibers.

38. The method of claim 37, wherein the fibers are cellulose fibers, hardwood fibers, or mixtures thereof.

39. The method of claim 25, wherein the aromatic hydrocarbons include one or more alkylated benzene compounds.

40. The method of claim 39, wherein the aromatic hydrocarbons further include naphthalene.

41. The method of claim 25, wherein the aromatic hydrocarbons are composed of trimethylbenzene.

42. The method of claim 25, wherein the aromatic hydrocarbons are composed of trimethylbenzene and naphthalene.

43. The method of claim 25, wherein the aromatic hydrocarbons have a boiling range between about 179° C. and about 213° C.

44. The method of claim 25, wherein the aromatic hydrocarbons include about 23 wt. % tetra-methyl benzenes, about 22 wt. % ethyl dimethyl benzenes, about 15 wt. % mono-, di- and tri-methyl indanes, about 8 wt. % diethyl benzenes, about 8 wt. % naphthalene, about 5 wt. % trimethyl benzenes, about 2 wt. % indane, and about 1 wt. % or less of methyl ethyl benzenes, propyl benzenes, methyl propyl benzenes, butyl benzenes, hexyl benzenes, indene, methyl naphthalenes, and xylenes.

45. The method of claim 25, wherein the aromatic hydrocarbons are AROMATIC 150, AROMATIC 200, AROMATIC 100, or a mixture thereof.

46. The tire sealer and inflating composition of claim 25, wherein the aromatic hydrocarbons are 1-chloro-2-methyl benzene, 1-chloro-4-methyl benzene, p-chlorotrifluoromethyl benzene, 1,2-dichloro-4-trifluoromethyl benzene, or mixtures thereof.

47. A method of making a tire sealer and inflating composition, comprising:
   obtaining a sealant capable of sealing an opening in an inflatable object;
   obtaining a non-flammable propellant having an ozone depletion potential of zero or substantially close to zero; and
   mixing one or more aromatic hydrocarbons capable of lowering the vapor pressure of the non-flammable propellant with the sealant and the non-flammable propellant;
   wherein the composition has a vapor pressure less than about 180 psig at 130° F.

* * * * *